United States Patent
Wallace et al.

(10) Patent No.: US 6,416,568 B1
(45) Date of Patent: Jul. 9, 2002

(54) HYDROGEN RECYCLE AND ACID GAS REMOVAL USING A MEMBRANE

(75) Inventors: Paul S. Wallace, Katy; Janice L. Kasbaum, Seabrook; Kay A. Johnson, Missouri City, all of TX (US)

(73) Assignee: Texaco, Inc., White Plains, NY (US)

( * ) Notice: Subject to any disclaimer, the term of this patent is extended or adjusted under 35 U.S.C. 154(b) by 0 days.

(21) Appl. No.: 09/570,200

(22) Filed: May 12, 2000

Related U.S. Application Data
(60) Provisional application No. 60/134,697, filed on May 14, 1999.

(51) Int. Cl.$^7$ .......................... B01D 53/22; B01D 53/06
(52) U.S. Cl. ................ 95/55; 95/45; 95/51; 95/171; 95/186; 95/236; 423/229; 423/232
(58) Field of Search .................. 95/159, 161, 163–169, 95/171, 174, 177, 180, 183, 186, 236, 45, 55; 423/229, 232, 233

(56) References Cited

U.S. PATENT DOCUMENTS

| | | | |
|---|---|---|---|
| 3,420,633 A | * 1/1969 | Lee | 95/236 X |
| 3,435,590 A | * 4/1969 | Smith | 95/236 X |
| 3,664,091 A | * 5/1972 | Hegwer | 95/163 X |
| 3,824,766 A | * 7/1974 | Valentine et al. | 95/163 |
| 3,975,172 A | * 8/1976 | Ranke | 95/236 X |
| 4,099,382 A | 7/1978 | Paull et al. | 60/648 |
| 4,178,758 A | 12/1979 | Paull et al. | 60/648 |
| 4,181,675 A | * 1/1980 | Makin et al. | 95/55 X |
| 4,242,108 A | * 12/1980 | Nicholas et al. | 95/236 X |
| 4,483,834 A | * 11/1984 | Wood | 95/236 X |
| 4,589,896 A | * 5/1986 | Chen et al. | 95/236 X |
| 4,853,012 A | * 8/1989 | Batteux et al. | 95/177 X |
| 4,869,884 A | 9/1989 | Riggs, Jr. | 423/229 |
| 5,082,481 A | * 1/1992 | Barchas et al. | 95/55 X |
| 5,131,930 A | * 7/1992 | Vines | 95/55 |
| 5,183,482 A | * 2/1993 | Najjar et al. | 95/55 X |
| 5,472,986 A | 12/1995 | van Dijk | 518/705 |
| 5,621,155 A | 4/1997 | Benham et al. | 585/310 |
| 5,979,178 A | * 11/1999 | Engler et al. | 95/55 X |
| 6,141,988 A | * 11/2000 | Engler et al. | 95/55 X |
| 6,162,282 A | * 12/2000 | Walters et al. | 95/183 X |

FOREIGN PATENT DOCUMENTS

WO    WO99/12847    3/1999

\* cited by examiner

*Primary Examiner*—Robert H. Spitzer
(74) *Attorney, Agent, or Firm*—Howrey Simon Arnold & White LLP

(57) ABSTRACT

The present invention is a process to recover a high purity, high pressure hydrogen gas stream from synthesis gas. The synthesis gas is contacted with a membrane that separates the synthesis gas into a hydrogen-enriched permeate and a hydrogen-depleted non-permeate. The permeate is conveyed to a carbon dioxide absorber. The carbon dioxide absorber removes carbon dioxide using a solvent. The carbon dioxide-rich solvent from the absorber is heated and sent to a gas-liquid contactor, where the solvent is regenerated by nitrogen stripping. A small recycle stream of a regenerating gas, i.e., hydrogen, is subsequently contacted with the solvent, stripping entrained and dissolved nitrogen from the solvent. This stripping gas, the regenerating gas, or preferably both, are then mixed with the non-permeate for combustion in a combustion turbine.

40 Claims, 2 Drawing Sheets

HYDROGEN RECYCLE AND ACID GAS REMOVAL USING A MEMBRANE

This application claims priority of U.S. Provisional Application No. 60/134,697, filed May 14, 1999.

BACKGROUND OF THE INVENTION

The production of synthesis gas from the solid and liquid carbonaceous fuels, especially coal, coke, and liquid hydrocarbon feeds, has been utilized for a considerable period of time and has recently undergone significant improvements due to the increased energy demand and the need for clean utilization of otherwise low value carbonaceous material. Synthesis gas may be produced by heating carbonaceous fuels with reactive gases, such as air or oxygen, often in the presence of steam in a gasification reactor to obtain the synthesis gas which is withdrawn from the gasification reactor.

The synthesis gas can also be used to generate power from otherwise environmentally unacceptable fuel sources, and as a source of feed gas for the synthesis of hydrocarbons, oxygen-containing organic compounds or ammonia.

Synthesis gas mixtures comprise carbon monoxide, carbon dioxide, and hydrogen. Hydrogen is a commercially important reactant for hydrogenation reactions.

Other trace materials often found in the synthesis gas include hydrogen sulfide, ammonia, cyanides, and particulates in the form of carbon and trace metals. The extent of the contaminants in the feed is determined by the type of feed and the particular gasification process utilized as well as the operating conditions. As the product gas is discharged from the gasifier, it is usually subjected to a cooling and cleaning operation involving a scrubbing technique wherein the gas is introduced into a scrubber and contacted with a water spray which cools the gas and removes particulates and ionic constituents from the synthesis gas. The initially cooled gas may then be treated to desulfurize the gas prior to utilization of the synthesis gas.

When the desired product is hydrogen, the synthesis gas from the gasifier is advantageously further processed by water-shifting, also called steam reforming, using catalyst to form hydrogen from carbon monoxide as shown below:

$$H_2O + CO \rightarrow H_2 + CO_2$$

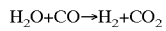

The water shift process, or steam reforming, converts water and carbon monoxide to hydrogen and carbon dioxide. The shift process is described in, for example, U.S. Pat. No. 5,472,986, the disclosure of which is incorporated herein by reference.

The hydrogen gas is often used in subsequent refining processes, particularly hydrotreating. For many applications, especially for hydrotreating hydrocarbons, the hydrogen is required at higher purity than is available in synthesis gas or even water shifted synthesis gas, and at pressures between about 1000 psi and about 3000 psi. The shifted or unshifted synthesis gas must therefore be purified to meet product specifications. In addition, the purified gas may need to be further compressed.

Relatively pure hydrogen at high pressure can be obtained from synthesis gas via the pressure swing absorption process. This method is expensive and requires significant capital outlay.

What is needed is an efficient and cost effective method of extracting a relatively pure high pressure hydrogen stream from synthesis gas.

SUMMARY OF THE INVENTION

The present invention is a process to recover a high purity, high pressure hydrogen gas stream from synthesis gas, and to efficiently recover and utilize the low grade carbon monoxide and dioxide gas that is the byproduct of the hydrogen purification. The synthesis gas is contacted with a membrane that separates the synthesis gas into a hydrogen-enriched permeate and a hydrogen-depleted non-permeate. The permeate is conveyed to a carbon dioxide absorber. The carbon dioxide absorber removes carbon dioxide using a solvent. The carbon dioxide-rich solvent from the absorber is heated and sent to a gas-liquid contactor, where the solvent is regenerated by nitrogen stripping. A small recycle stream of a regenerating gas, i.e., hydrogen, is subsequently contacted with the solvent, stripping entrained and dissolved nitrogen from the solvent. This stripping gas, the regenerating gas, or preferably both, are then mixed with the non-permeate for combustion in a combustion turbine.

DETAILED DESCRIPTION OF THE INVENTION

Figure 1:
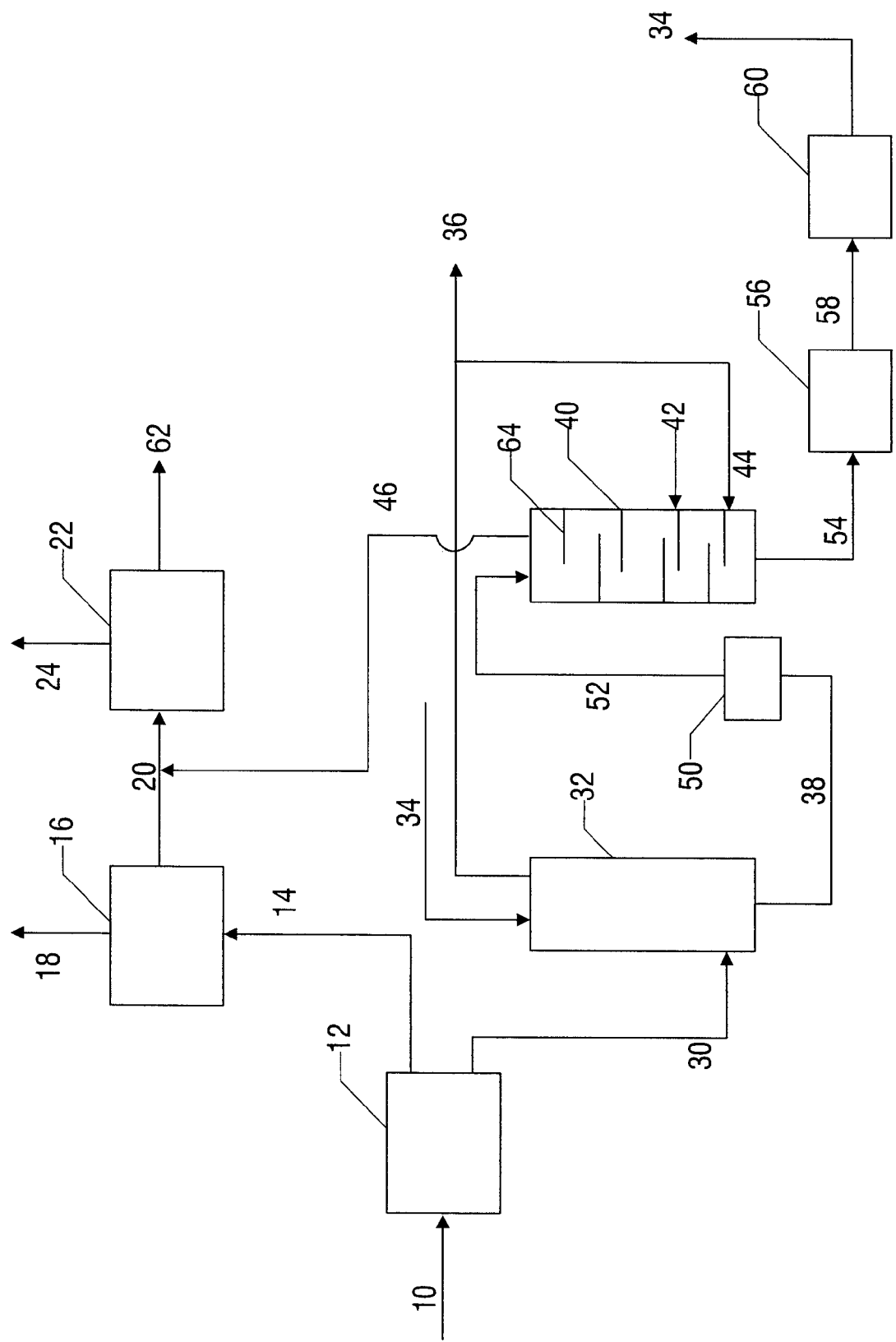
FIG. 1 is a schematic of one embodiment of the invention.
Figure 2:
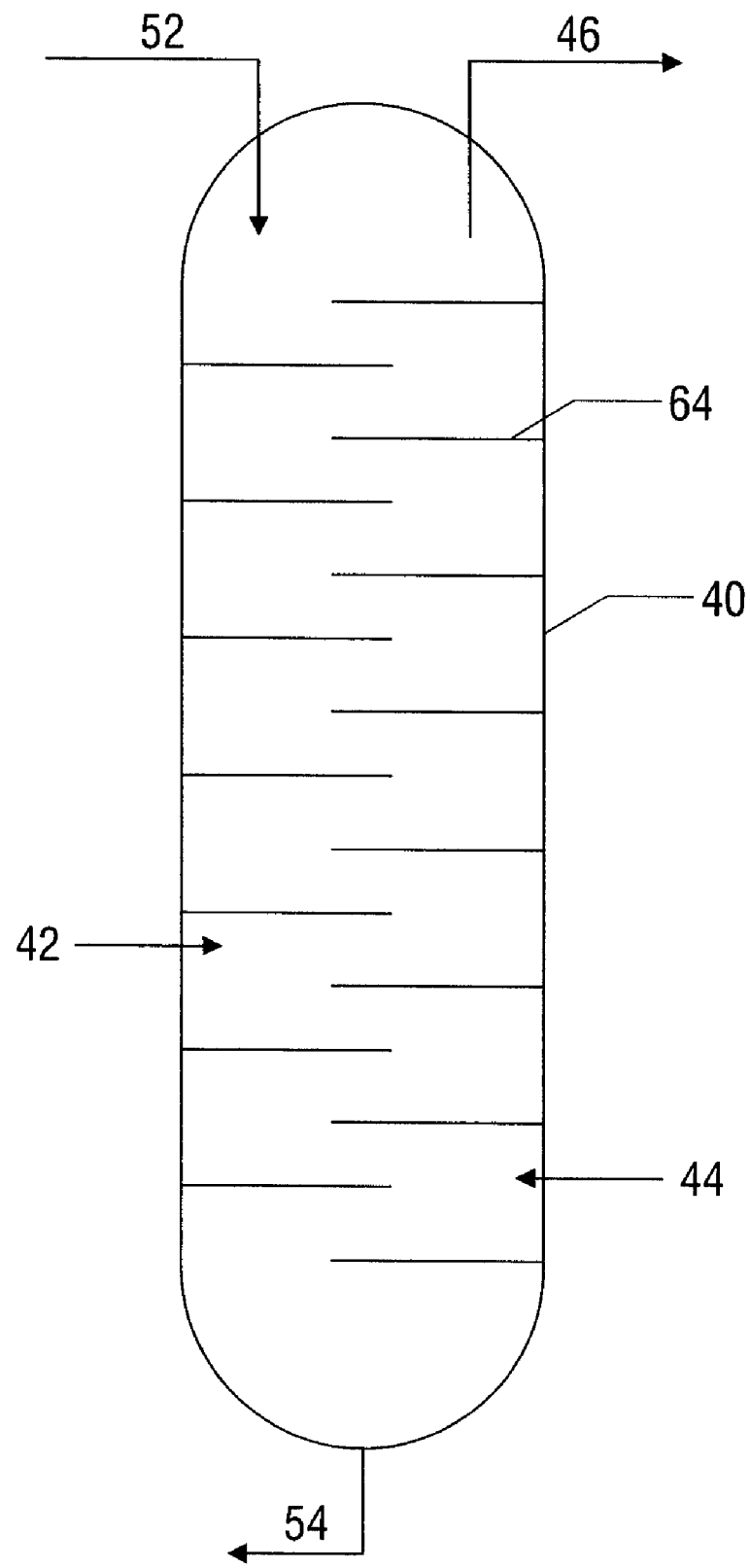
FIG. 2 is a more detailed drawing of one embodiment of a carbon dioxide stripper and solvent regenerator.

As used herein, the term "synthesis gas" refers to gases comprising both hydrogen gas and carbon monoxide gas. The mole ratio of hydrogen to carbon monoxide may, but need not necessarily, be about one to one. There are often some inerts in the synthesis gas, particularly nitrogen and carbon dioxide. There are often other contaminants present, such as hydrogen sulfide and COS.

As used herein, carbon oxides is a gas that is comprised of carbon monoxide, carbon dioxide, or both, and may contain other gases, particularly nitrogen and hydrogen.

As used herein, high-purity hydrogen is a gas that contains at least about 90 mole percent hydrogen, and preferably less than about 4 mole percent carbon oxides.

The synthesis gas is prepared by partially burning a hydrocarbonaceous fuel and oxygen in a reactor, often in the presence of steam, in proportions producing a mixture containing carbon monoxide and hydrogen in the reactor. The term "hydrocarbonaceous" as used herein to describe various suitable feedstocks is intended to include gaseous, liquid, and solid hydrocarbons, carbonaceous materials, and mixtures thereof. In fact, substantially any combustible carbon-containing organic material, or slurries thereof, may be included within the definition of the term "hydrocarbonaceous".

Synthesis gas can be manufactured by any gasification method. The hydrocarbonaceous fuels are reacted with substantially pure oxygen having greater than about 90 mole percent oxygen, or oxygen enriched air having greater than about 50 mole percent oxygen. Preferably, the gasification process utilizes substantially pure oxygen with above about 95 mole percent oxygen. The gasification processes are known to the art. See, for example, U.S. Pat. No. 4,099,382 and U.S. Pat. No. 4,178,758, the disclosures of which are incorporated herein by reference.

In the gasification reactor, the hydrocarbonaceous fuel is contacted with a free-oxygen containing gas, optionally in the presence of a temperature moderator, and synthesis gas is manufactured. In the reaction zone, the contents will commonly reach temperatures in the range of about 900° C.

to 1700° C., and more typically in the range of about 1100° C. to about 1500° C. Pressure will typically be in the range of about 1 to about 250 atmospheres, and more typically in the range of about 15 to about 150 atmospheres, and even more typically in the range of about 500 to about 2000 psi.

The synthesis gas is cooled and washed of contaminants, preferably with energy recovery such as by steam raising and/or steam superheating. There may follow lower grade heat recoveries. There may be other conventional gas treatment steps such as steam removal and, where appropriate, of composition adjustment.

If hydrogen gas is a desired product, it may be advantageous to subject the synthesis gas to steam reforming to increase the relative yield of hydrogen gas. The steam reforming, also called shift, process is described in, for example, U.S. Pat. No. 5,472,986, the disclosure of which is incorporated herein by reference. A preferred shift reaction is a sour shift, where there is almost no methane and the shift reaction is exothermic.

Steam reforming is a process of adding water, or using water contained in the gas, and reacting the resulting gas mixture adiabatically over a steam reforming catalyst. The primary purpose of steam reforming is to increase the amount of hydrogen in the gas mixture. The synthesis gas typically contains hydrogen sulfide ($H_2S$) and COS formed from sulfur in the feed to the gasifier. The COS is shifted in the steam reformer following the same reaction path as carbon monoxide to form hydrogen sulfide and carbon dioxide.

Low temperature shift reactors have gas temperatures in the range of about 150° to 300° C., more typically between about 200° to 250° C. Low temperature shift catalysts are typically copper oxides that may be supported on zinc oxide and alumina. Steam shifting often is accompanied by efficient heat utilization using, for example, product/reactant heat exchangers or steam generators. Such shift reactors are known to the art.

The synthesis gas composition of a gasification reaction is typically hydrogen gas at 25 to 45 mole percent, carbon monoxide gas at 40 to 50 mole percent, carbon dioxide gas at 10 to 35 mole percent, and trace contaminants. In a steam reformed synthesis gas a typical composition is hydrogen gas at 35 to 65 mole percent, carbon monoxide gas at 10 to 20 mole percent, carbon dioxide gas at 30 to 60 mole percent, and trace contaminants. These ranges are not absolute, but rather change with the fuel gasified as well as with gasification parameters.

An acid gas remover may be used to reduce the concentration of hydrogen sulfide in the gas stream. Said acid gas removers are similar to the carbon dioxide absorber described herein. Typically, an acid gas remover will be designed to remove trace levels of hydrogen sulfide, and will not significantly affect the carbon dioxide concentration of the gas. Hydrogen sulfide from the acid gas removal unit is typically routed to an acid gas stream which is sent to a sulfur recovery process.

The cooled and partially processed synthesis gas, in line (10) in the drawing, is then processed to provide a hydrogen rich gas stream and a carbon/dioxide rich gas stream. Other impurities in the gas generally follow the carbon monoxide/dioxide rich gas stream.

The synthesis gas is provided at a temperature between about 10° C. and about 100° C., typically in the range of 30° C. to 50° C. The synthesis gas is passed along a membrane at high pressure, typically between about 500 and about 2000 psi, more typically between about 800 psi and about 1200 psi.

Use of a membrane system is the preferred method to affect the separation. The synthesis gas is contacted with a membrane (12), said membrane of a material and construction that allows small molecules like hydrogen to preferentially pass through (permeate) while the larger molecules (such as carbon monoxide and carbon dioxide, collectively) preferentially do not permeate.

Membranes are a cost effective alternative to, for example, a pressure swing absorption unit. The membranes typically reduce the pressure of the product hydrogen so it has to be compressed prior to use. However, the pressure of the non-permeate is sufficiently high to allow use in a combustion turbine without further compression. The off gas from a pressure-swing absorption unit is provided at nearly atmospheric pressure, and subsequent utilization for any application other than boiler fuel requires compression. Use of this gas for boiler fuel is not preferred for economic reasons.

The membrane can be of any type which is preferential for permeation of hydrogen gas over carbon dioxide and carbon monoxide. Many types of membrane materials are known in the art which are highly preferential for diffusion of hydrogen compared to nitrogen. Such membrane materials include those composed of silicon rubber, butyl rubber, polycarbonate, poly(phenylene oxide), nylon 6,6, polystyrenes, polysulfones, polyamides, polyimides, polyethers, polyarylene oxides, polyurethanes, polyesters, and the like. The membrane units may be of any conventional construction, and a hollow fiber type construction is preferred.

The synthesis gas is passed along a membrane at high pressure, typically between about 500 and about 2000 psi, more typically between about 800 psi and about 1200 psi. A hydrogen-rich gas permeates through the membrane. The permeate experiences a substantial pressure drop of between about 300 to 700 psi as it passes through the membrane. The permeate is typically in the range of between about 200 psi and 1500 psi, more typically between about 400 psi and 700 psi.

The hydrogen-rich gas is used in subsequent processes, particularly hydrotreating. For many applications, especially for hydrotreating hydrocarbons, the hydrogen is required at higher purity and at pressures of between about 1000 psi and about 3000 psi. The shifted synthesis gas typically must therefore be compressed and purified to meet product specifications.

A hydrogen enriched permeate gas containing between about 30 and 90, typically about 80, mole percent hydrogen and between about 4 and about 70, typically about 20, mole percent total of carbon monoxide and carbon dioxide, permeates through the membrane. The permeate experiences a substantial pressure drop of between about 300 to 700 psi, typically 500 to 700 psi, as it passes through the membrane.

The hydrogen-rich permeate is advantageously compressed to between about 800 and 2000 psi for use in subsequent operations, i.e., for use in hydrotreating of crude oil. Power for compression may be obtained by the partial expansion of the non-permeate. The non-permeate is advantageously burned in a combustion turbine (22) to generate power. Combustion turbines typically operate with feed pressure of between about 200 psi and 500 psi.

The non-permeate gas stream from the membrane, in line (14) in the drawing, contains carbon dioxide, carbon monoxide, and some hydrogen. This non-permeate gas is at high pressure. The non-permeate's pressure is virtually unaffected by the membrane. While this non-permeate gas may be burned in boilers or other heat generating processes, this gas is advantageously burned in a combustion turbine to generate power.

The non-permeate gas pressure is advantageously reduced from between about 800 psi and about 1600 psi to between about 200 and about 500 psi for use in a combustion turbine (22) by expanding the gas in an expander (16). The non-permeate gas is advantageously expanded in a manner to provide power, depicted in the drawing by line (18). Said power may be advantageously used to compress the permeate gas. The power generated by the non-permeate expander can be used to compress the hydrogen either directly or indirectly. The direct method couples the expander to the compressor so that the expander drives the compressor. If indirect powering is required, electricity can be generated by the expander which can power the compressor.

It is preferred that an expander be directly coupled with a compressor. The expander/compressor has an expander in which the non-permeate expands, which directly drives a compressor which compresses the permeate. No motor is required. The compressor and expanders may be turbine, pistons, or any other design known to the art. In any event, the mass throughput through the compressor and expander must balance the compression and expansion pressure ratios.

For a turbine compressor/turbine expander, any changes in mass flow there between must not exceed the design of the gas turbine thrust bearing. Under typical designs, there may be a maximum of 10% variation in relative mass flow through the expander side than that flowing through the compressor side. At the same time, it is recognized that the required flow rates may vary by a factor of more than ten, i.e., from about 10 to about 400 million standard cubic feet per day for a typical facility. Nevertheless, the relationship between throughput and compression ratios is well understood. It is therefore within the skill of one skilled in the art, with the benefit of this disclosure, to size an expander/compressor system.

The expanded non-permeate is then conveyed via line (20) to the combustion turbine (22), where it is combusted, giving an exhaust (62) and power, depicted in the drawing by line (24).

The hydrogen-rich permeate may be advantageously subjected to steam reforming to increase the relative yield of hydrogen gas. The process of steam reforming has been previously described. Steam reforming will reduce the carbon monoxide content of the permeate, while increasing the hydrogen and carbon dioxide concentration of the permeate.

The permeate in line (30) may contain between about 4 to 70 mole percent carbon oxides. If the permeate has been steam reformed, most of these carbon oxides will be in the form of carbon dioxide. This carbon dioxide, as well as the carbon monoxide and to a lesser extent other contaminates, in the hydrogen-rich permeate must be reduced.

The permeate is conveyed via line (30) to a carbon dioxide absorber (32). The carbon dioxide absorber is a gas-liquid contactor that removes carbon dioxide, and to a lesser extent carbon monoxide, nitrogen, and hydrogen, by contacting the gas with a solvent provided by line (34).

As used herein, the term "solvent" is any liquid that preferentially removes carbon dioxide, as opposed to hydrogen, from a gas stream comprising both carbon dioxide and hydrogen. The carbon dioxide absorber advantageously removes carbon monoxide and carbon dioxide by contacting the gas with an amine or a physical solvent.

The acid gas removal gas-liquid contactor typically operates at below about 100° C., preferably below about 70° C., more preferably below about 40° C. The permeate and the solvent are cooled as needed, preferably utilizing the heat via a heat exchanger with another fluid.

In the carbon dioxide removal step, the so-called "chemical" solvents can be used, such as ethanolamines or potassium carbonate, especially in the established processes such as "AMINE GUARD", "BENFIELD", "BENFIELD-DEA", "VETROCOKE" and "CATACARB".

As examples of physical solvents there may be mentioned: tetramethylene sulfone ("SULFINOL"); propylene carbonate (FLUOR); N-methyl-2-pyrrolidone ("PURISOL"); polyethyleneglycol dimethyl ether ("SELEXOL"); methanol ("RECTISOL"), and water. Water can be used, especially if there is pH control of the water.

One method is a carbonate-based water system wherein carbonates such as potassium carbonate in the water lowers the pH. This low pH water absorbs carbon dioxide to form bicarbonate salts. Later, heating this water liberates carbon dioxide and regenerates the potassium carbonate.

Conventional amine solvents, such as MDEA, can be used to remove the hydrogen sulfide. The fluids may be solvents such as lower monohydric alcohols, such as methanol, or polyhydric alcohols such as ethylene glycol and the like. The fluid may contain an amine such as diethanolamine, methanol, N-methyl-pyrrolidone, or a dimethyl ether of polyethylene glycol. The physical solvents are preferred because they operate better at high pressure.

The permeate gas is contacted with the solvent in a gas-liquid contactor, called herein a carbon dioxide absorber. Said contactor may be of any type known to the art, including but not limited to trays (64) or a packed column. Flow is typically countercurrent. The quantity of solvent throughput will depend, among other things, on the number of theoretical plates in the contactor, the type of solvent used, the gas throughput, and the pressure and temperature in the contactor. Operation of such an acid removal contactor is, with the benefit of this disclosure, within the ability of one skilled in the art.

The carbon oxides laden carbon dioxide solvent is removed from the acid gas removal contactor via line (38) and heated in heater (50). The solvent is heated to above about 70° C., preferably above about 90° C., more preferably above about 110° C.

The heated carbon dioxide-rich solvent from the absorber is then sent via line (52) to a carbon dioxide recovery unit (40), where the carbon dioxide and other gases are removed from the solvent by inert gas stripping.

By inert gas it is meant a gas that does not preferentially remain in the solvent, i.e., gas that is not carbon dioxide nor a gas that reacts similarly to carbon dioxide with the solvent. This can be any of a variety of gases. Because of the availability of methane and/or nitrogen in a gasification process, these gases are preferred. Nitrogen is a byproduct of gasification because oxygen-enriched air and substantially pure oxygen are produced from air separation plants. Such plants are known in the industry and are commercially available. The nitrogen is advantageously supplied via line (42) by the air separation plant generating substantially pure oxygen for gasification.

The carbon oxides, plus dissolved hydrogen, are then stripped from the carbon dioxide solvent using nitrogen. It is preferred that the stripping be done in a gas-liquid contactor, called herein a carbon dioxide solvent regenerator. Said contactor may be of any type known to the art, including but not limited to trays (64) or a packed column. Operation of such a contactor is known in the art. The quantity of nitrogen used will depend on the number of theoretical plates in the contactor, the type of solvent used, the solvent throughput, and the pressure and temperature. Operation of such a contactor is, with the benefit of this disclosure, within the ability of one skilled in the art.

The stripping is preferably performed at a pressure equal to or greater than the pressure of the combustion turbine fuel, i.e., at least about 100 psi, more typically 200 to 500 psi. The nitrogen-carbon oxides-hydrogen gas stream is advantageously conveyed via line (46) to the combustion turbine (22), where it is mixed with the non-permeate. The nitrogen-carbon oxides-hydrogen gas stream provides power to the combustion turbine and moderates the temperature within the turbine. The presence of the nitrogen-carbon dioxide-hydrogen diluent gas in the combustion turbine to be used as diluent gas both reduces nitrogen oxides (NOx) emissions in vented exhaust (62) and increases power output (24).

The amount of stripping gas, i.e., nitrogen, needed to recover the carbon oxides from the solvent will depend on the type of solvent, the pressure, the temperature, and the number of theoretical plates in the gas-liquid contactor. Typically the amount of stripping gas is 0.5 to 20 times the volume of the solvent at the stripper pressure and temperature, but the range varies widely. For example, the optimum volume ratio is about 3:1 with one solvent and 10:1 with another. The setting of the flow-rates is within the ability of one skilled in the art, given the benefit of this disclosure. Large excesses of nitrogen should be avoided, as the combined permeate/stripped gas may become non-flammable if too much nitrogen is added.

The solvent contains residual nitrogen. It is important to minimize the nitrogen in the recycled solvent, because this solvent is eventually cooled and recycled to the acid gas contactor. Said nitrogen will transfer to the permeate in the carbon dioxide absorber. While this poses no problems if the hydrogen will be used to generate ammonia, the nitrogen can be problematic in other processes. For example, it can be converted to undesired ammonia in hydroprocessing units.

The solvent is therefore advantageously regenerated by removing most of the nitrogen in the solvent prior to recycling the solvent. The nitrogen may be removed from the solvent by exposing the solvent to low, near atmospheric pressure. Alternatively, the nitrogen may be stripped from the solvent using a small sidestream of hydrogen.

The nitrogen may be stripped from the solvent in the same gas-liquid contactor where the carbon dioxide is stripped with nitrogen, by injecting the hydrogen in line (44) below, that is, downstream from the nitrogen injection nozzle. This will be effective only if there is sufficient contact, at least equivalent to about 3 or 4 theoretical plates, between the hydrogen injector (44) and the nitrogen injector (42). A small stream of the hydrogen is injected through the solvent and bubbles up, eventually co-mingling with the nitrogen and providing a more complete removal of carbon dioxide. This hydrogen rich gas is beneficially injected in the carbon dioxide stripper The H2 injection helps to displace nitrogen that is saturated in the solvent, and it essentially strips the bulk of the nitrogen from the solvent. Advantages are that the hydrogen will help displace nitrogen from the solvent, the hydrogen strips the bulk of the nitrogen from the solvent, this hydrogen is co-mingled with the stripped gas for use in the combustion turbine, and finally that this hydrogen reduces the quantity of nitrogen required to remove a given amount of carbon dioxide from the solvent.

The hydrogen stream may also advantageously be contacted with the nitrogen-laden solvent in a separate gas-liquid contactor. This contactor may provide more theoretical plates if the solvent regenerator contactor is limited in size. This stripper gas may be co-mingled with the nitrogen-carbon oxides-hydrogen gas stream from the solvent regenerator contactor, and routed to the combustion turbine. This gas can also be co-mingled with the stripped gas and the non-permeate.

The amount of hydrogen, or hydrogen-rich gas containing at least 60%, preferably at least 90%, of hydrogen gas needed will depend on the type of solvent, the pressure, the temperature, and the number of theoretical plates in the gas-liquid contactor. Typically the amount of regenerating gas is 0.5 to 10 times the volume of the solvent at the stripper pressure and temperature, but the range varies widely with type of solvent, pressure, temperature, design and operation of the contactor. The setting of the flow-rates is within the ability of one skilled in the art, given the benefit of this disclosure. Large excesses of hydrogen should be avoided, as the hydrogen is valuable product.

The hydrogen strips nitrogen that is dissolved and/or entrained in the solvent, thereby regenerating the solvent. This hydrogen-nitrogen gas from this secondary stripping is advantageously mixed with the nitrogen-carbon dioxide gas from the primary stripping. The resulting gas stream is routed to the combustion turbine (22) via line (46) where it is mixed with non-permeate and burned/expanded in the combustion turbine.

Advantageously, the stripping is performed at a pressure such that this stream does not need to be compressed to be used as combustion turbine fuel. The presence of the nitrogen-carbon dioxide-hydrogen diluent gas, in addition to the non-permeate, in the combustion turbine acts as diluent gas, reducing nitrogen oxides (NOx) emissions and increasing power output.

Because the nitrogen in the solvent leaving the solvent regenerator contactor has little value, another method of stripping the nitrogen from the solvent is first lowering the pressure to below about 100 psi, preferably below about 50 psi, more preferably below about 20 psi. The solvent may be exposed to atmospheric pressure or, in some cases, to a vacuum of up to 5 psia. The gas that evolves is separated, treated as necessary, and vented. It may be beneficial to pass the solvent through a gas-liquid contactor, where a small stream of hydrogen removes residual nitrogen. Again, it is preferable that this gas-liquid contactor be operated at a pressure equal to or greater than the combustion turbine feed pressure, so that this stripper gas can be co-mingled with the non-permeate fuel gas.

The solvent is then cooled as needed and recycled to the acid gas removal contactor. The solvent is then conveyed via line (54) to a pump (56), where the pressure is increased so that the solvent can be re-injected into the carbon dioxide absorber (32). The solvent is advantageously conveyed via line (58) to a cooler (60) and then to the carbon dioxide absorber via line (34). It may be advantageous to cool the solvent prior to pumping. Such design changes are well within the skill of one skilled in the art.

The hydrogen stripping of the solvent reduces the amount of nitrogen in the permeate hydrogen, because the solvent is not saturated with nitrogen and therefore can absorb nitrogen present in the permeate.

The source of the hydrogen-rich solvent regenerating gas is advantageously a sidestream (44) of the product permeate gas stream (36). This gas may be from the permeate stream either upstream or downstream of the acid gas removal contactor. If the hydrogen is from the permeate prior to the acid gas removal contactor, then entrained carbon monoxide and carbon dioxide will enter the solvent at this point. Because the size of the sidestream hydrogen used to strip nitrogen is small, the solvent will still have ample capability to absorb carbon dioxide from the permeate gas in the acid gas removal contactor. However, for many solvents the capacity to absorb carbon monoxide, like the capacity to absorb nitrogen, is limited, and adding carbon monoxide during regenerating may significantly reduce the ability of the solvent to remove carbon monoxide from the gas.

The permeate gas stream may then be routed to a methanator to convert residual carbon oxides and a small amount of hydrogen to methane. This is only necessary if the presence of small quantities of carbon oxides interferes with subsequent use of the hydrogen rich permeate gas. Methanation reactions combine hydrogen with residual carbon oxides to form methane and water. These reactions are strongly exothermic. The catalyst is typically nickel supported on a refractory substance such as alumina. This methanation step reduces the carbon oxides to below about 20 ppm, preferably below about 5 ppm. Such methanation reactors are known in the art. The product high purity hydrogen is cooled and routed to down stream units for use.

The compression of the hydrogen rich permeate gas can be at any point in this process. It is within the ability of one skilled in the art, given the benefit of this disclosure, to optimize when the permeate gas is best compressed. It is known that some solvents work best at higher pressures, and some are more effective at lower pressures.

The separation of high purity hydrogen from using membrane and CO2 removal with hydrogen stripping is useful technology. Increased hydrogen purity is a technical advantage in subsequent uses. Capturing the maximum amount of CO2 and N2 diluent for use in the combustion turbines increases efficiency and improves the environmental performance of the technology.

While the mechanisms, compositions and methods of this invention have been described in terms of preferred embodiments, it will be apparent to those of skill in the art that variations may be applied to the process described herein without departing from the concept and scope of the invention. All such similar substitutes and modifications apparent to those skilled in the art are deemed to be within the scope and concept of the invention as it is set out in the following claims.

What is claimed is:

1. A process of recovering high pressure carbon dioxide from a gas, said process comprising:
   a) providing a carbon dioxide-containing gas at high pressure;
   b) providing a liquid solvent, said solvent being capable of absorbing the carbon dioxide present in the gas;
   c) contacting the high pressure carbon dioxide-containing gas with the liquid solvent in a gas-liquid contactor under high pressure;
   d) separating the carbon dioxide-laden solvent from the carbon dioxide depleted gas;
   e) heating the carbon dioxide-laden solvent;
   f) contacting the heated carbon dioxide-laden solvent with an inert stripper gas, wherein the stripper gas is at pressure greater than about 100 psi, said contacting under conditions such that the stripper gas strips carbon dioxide from the solvent; and
   g) separating the stripper gas comprising the carbon dioxide from the heated solvent.

2. The process of claim 1 wherein the carbon dioxide-containing gas is at a pressure of between about 200 psi and about 1500 psia.

3. The process of claim 1 wherein the carbon dioxide-containing gas comprises at hydrogen, carbon dioxide, and carbon monoxide, and wherein the sum of the carbon dioxide and carbon monoxide equals between about 4 to about 70 mole percent.

4. The process of claim 1 wherein the liquid solvent comprises ethanolamines or potassium carbonate.

5. The process of claim 1 wherein the liquid solvent comprises one or more of the list consisting of tetramethylene sulfone, propylene carbonate, N-methyl-2-pyrrolidone, polyethyleneglycol dimethyl ether, methanol, ethylene glycol, diethanolamine, or water.

6. The process of claim 1 wherein the liquid solvent is heated to a temperature of at least about 70° C.

7. The process of claim 1 wherein the liquid solvent is heated to a temperature of at least about 90° C.

8. The process of claim 1 wherein the inert gas is nitrogen.

9. The process of claim 1 wherein the inert gas is between about 0.5 to about 20 times the volume of the heated solvent at the pressure and temperature wherein the inert gas contacts the heated solvent.

10. The process of claim 1 further comprising removing the inert gas from the heated solvent by contacting the heated solvent with a gas comprising at least about 60 mole percent hydrogen gas.

11. The process of claim 10 wherein the gas comprising at least 60 mole percent hydrogen is between about 0.5 to about 10 times the volume of the heated solvent at the pressure and temperature wherein the gas contacts the heated solvent.

12. The process of claim 1 further comprising removing the inert gas from the solvent by exposing the solvent to a pressure below about 50 psi, and separating any flashed gas from the liquid.

13. The process of claim 12 wherein the pressure is below about 20 psi.

14. The process of claim 12 further comprising contacting the heated solvent with a gas comprising at least about 60 mole percent hydrogen gas after separating off flashed gas.

15. A process of recovering carbon dioxide gas at high pressure, said process comprising:
   a) providing a synthesis gas at a temperature between about 10° C. and about 100° C. and at a pressure between about 500 and about 2000 psi, said synthesis gas comprising hydrogen, carbon dioxide, and carbon monoxide;
   b) contacting the gas with a membrane, said membrane of a material and construction that allows small molecules to preferentially permeate while the carbon monoxide and carbon dioxide preferentially do not permeate, thereby separating the synthesis gas into a hydrogen-enriched permeate and a hydrogen-depleted non-permeate;
   c) contacting the hydrogen-enriched permeate with a liquid solvent, said solvent being capable of absorbing carbon dioxide present in the gas, under conditions so that at least about 90% by weight of the total amount of carbon monoxide and carbon dioxide originally present in the permeate is contained in the solvent;
   d) separating the carbon dioxide-containing solvent from the gas;
   e) heating the solvent;

f) contacting the heated carbon dioxide-containing solvent with a stripping gas, wherein the stripping gas is at pressure greater than about 100 psi, said contacting under conditions such that the stripping gas strips carbon monoxide and carbon dioxide from the solvent; and g) separating the stripping gas from the heated solvent, wherein the stripping gas comprises the carbon dioxide.

16. The process of claim 15 wherein the stripping gas comprises nitrogen, methane, or a mixture thereof.

17. The process of claim 16 further comprising removing the stripping gas dissolved in the solvent by exposing the solvent to a pressure below about 50 psi, and separating any flashed gas from the liquid.

18. The process of claim 17 wherein the pressure is below about 20 psi.

19. The process of claim 16 further comprising contacting the heated solvent with a regenerating gas comprising at least about 60 mole percent hydrogen gas after contacting the heated solvent with the stripping gas, wherein said contacting is under conditions to remove at least a portion of the stripping gas.

20. The process of claim 19 wherein the regenerating gas comprises at least about 90 mole percent hydrogen gas.

21. The process of claim 19 wherein the regenerating gas is at pressure between about 200 and about 500 psi, further comprising adding the regenerating gas to the non-permeate prior to combusting the non-permeate.

22. The process of claim 21 wherein the stripping gas and the regenerating gas contact the heated solvent within a single gas-liquid contactor.

23. The process of claim 15 wherein the stripping gas comprises nitrogen.

24. The process of claim 23 further comprising methanating the permeate after separating the permeate from the solvent.

25. The process of claim 15 wherein the membrane comprises one or more of a group consisting of silicon rubber, butyl rubber, polycarbonate, poly(phenylene oxide), nylon 6,6, polystyrenes, polysulfones, polyamides, polyimides, polyethers, polyarylene oxides, polyurethanes, and polyesters.

26. The process of claim 15 wherein the permeate contains between about 50 and about 90 mole percent hydrogen gas.

27. The process of claim 15 wherein the synthesis gas is at a temperature between about 30° C. to about 50° C. and at a pressure of between about 800 psi and about 1200 psi.

28. The process of claim 15 wherein the permeate gas is at a pressure of between about 100 psi and about 900 psi.

29. The process of claim 15 further comprising steam reforming the permeate prior to contacting the permeate with the liquid solvent.

30. The process of claim 15 wherein the liquid solvent comprises ethanolamines or potassium carbonate.

31. The process of claim 15 wherein the liquid solvent comprises one or more of tetramethylene sulfone, propylene carbonate, N-methyl-2-pyrrolidone, polyethyleneglycol dimethyl ether, methanol, ethylene glycol, diethanolamine, and water.

32. The process of claim 15 wherein the solvent is heated to a temperature of at least about 70° C.

33. The process of claim 15 wherein the liquid solvent is heated to a temperature of at least about 90° C.

34. The process of claim 15 wherein the stripping gas is between about 0.5 and about 20 times the volume of the heated solvent at the pressure and temperature wherein the stripping gas contacts the heated solvent.

35. The process of claim 15 further comprising removing stripping gas dissolved in the heated solvent by contacting the heated solvent with a regenerating gas comprising at least about 60 mole percent hydrogen gas.

36. The process of claim 35 wherein the regenerating gas is between about 0.5 to about 10 times the volume of the heated solvent at the pressure and temperature wherein the gas contacts the heated solvent.

37. The process of claim 36 further comprising compressing the permeate to a pressure of between about 800 psi and about 2000 psi, wherein the power needed to compress the permeate is at least in part provided by expanding the non-permeate.

38. The process of claim 15 further comprising expanding the non-permeate to a pressure of between about 200 psi to about 500 psi, thereby generating power.

39. The process of claim 38 further comprising combusting the non-permeate in a combustion turbine.

40. The process of claim 38 wherein the stripping gas is at pressure between about 200 and about 500 psi, further comprising adding the stripping gas to the non-permeate prior to combusting the non-permeate.

* * * * *